Patented July 12, 1949

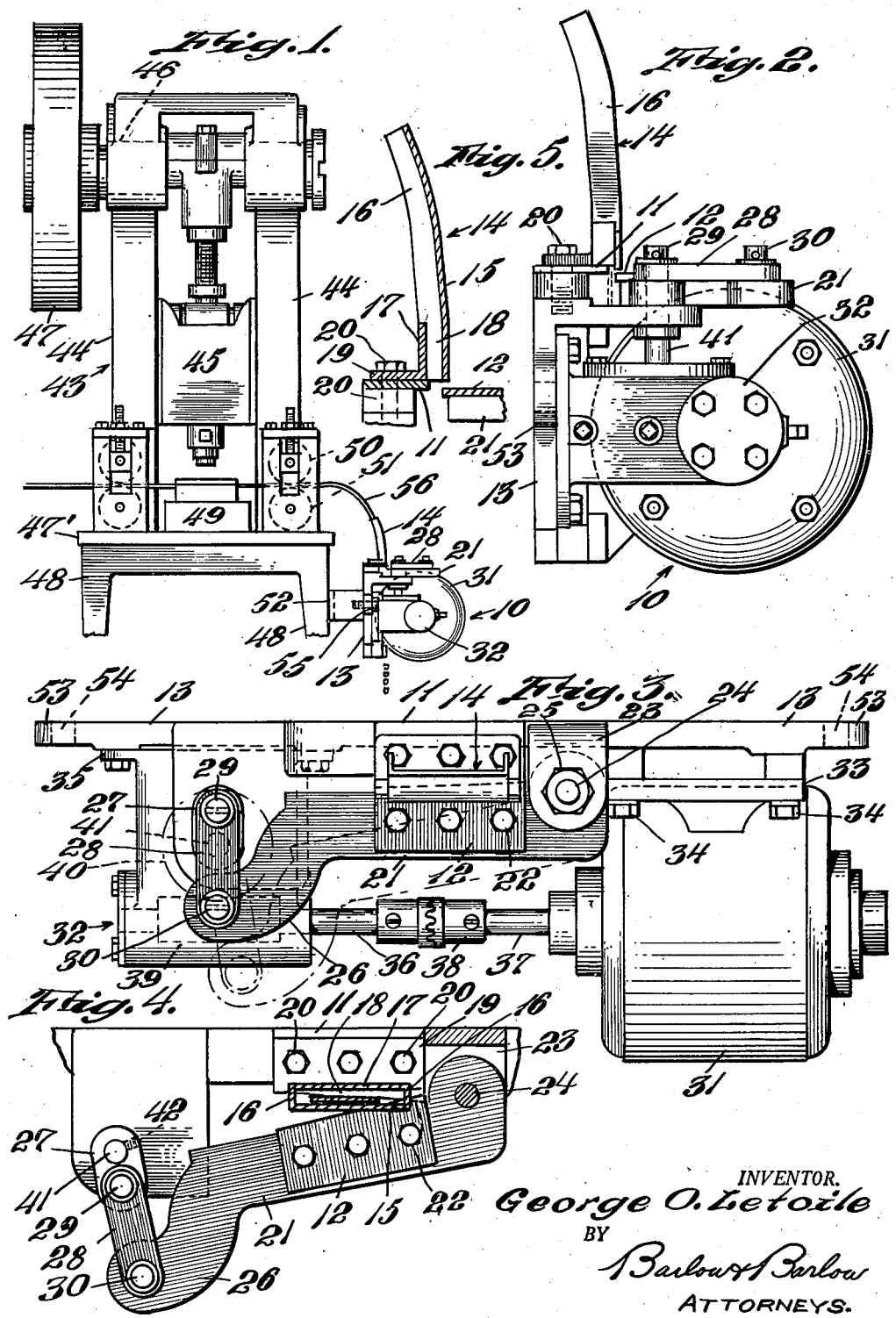

2,475,747

UNITED STATES PATENT OFFICE 2,475,747

METAL CHOPPER FOR PRESSES OR THE LIKE

George O. Letoile, Pawtucket, R. I.

Application August 22, 1947, Serial No. 770,103

2 Claims. (Cl. 164—10.6)

This invention relates to a chopping of waste stock which comes from machine operations, cutting from strip stock the blanks or work to be produced on the machine.

In the use of a machine, such as a press, which cuts from a strip of stock the work to be produced, some means is desirable to conveniently dispose of the waste strip stock which emerges from the press. Chopping this material into small parts has been found desirable, and there have been provided chopping devices somewhat after the manner of a guillotine chopper which are operated by the press by chopping the waste strip in the same plane that the strip travels while the press operates on the same. Such chopping devices in use very frequently vary the feed of the work through the press to such an extent that poor work is produced either because of the chopper being dull and causing a pull on the work as the press operates or because the guillotine knife may interrupt the feed of the work so as to retard the strip as feeding through the press. Also, a considerable blow must be struck by the guillotine type of cutting knife which reciprocates and causes the cutting edge to strike the work at the full width of the work at one time. Considerable power must be provided for such action.

One of the objects of this invention is to provide a metal chopping device so arranged on the press that there is an opportunity for the feed of the press to continue without interruption of the chopper either by way of pull on the strip or by retarding its movement.

More specifically, an object of this invention is to locate the chopper at such a point that there will be a bow formed in the work to take up variations between the feed of the press and the feed to the chopper so that the press may continue its feed uninfluenced by the chopper.

Another object of this invention is to provide a knife which will have a shearing cut on the work, entering the work at one edge and progressively shearing across the same so that the power required for the operation of the knife may be reduced to a minimum.

Another object of this invention is to provide a more even operating cutting of the work.

Another object of this invention is to provide a chopping device which is a unit and thus will always maintain the stroke desired for it without being influenced by the changing of tools in the press which necessitates adjustment of the stroke of the press and, consequently, the stroke of the chopper.

With these and other objects in view, the invention consists of certain novel features of construction as will be more fully described and particularly pointed out in the appended claims.

In the accompanying drawings:

Fig. 1 is a front elevational view of a power-operated press with a metal chopping device attached thereto embodying my invention;

Fig. 2 is an end view of the metal chopping device shown in Fig. 1 on an enlarged scale;

Fig. 3 is a top plan view of the chopping device showing the opened position of the movable shearing blade in dot and dash lines;

Fig. 4 is a top plan view of a fragmental portion of the chopping device with certain parts omitted and showing the relative position of the work with the shearing blades; and Fig. 5 is a longitudinal central section through the metal strip guide and showing the relation of the shearing blades thereto.

In proceeding with this invention, I have located a guide so as to receive and direct the waste strip from the press in a plane at substantially right angles to the feeding of the strip through the press while the work is being manipulated from the strip, and I provide by this arrangement of the right-angular planes of operation a bow in the strip which needs no guiding by separate guides and yet will bow outwardly or inwardly in accordance with the variation of the feed of the press and the reception of the same in the chopper. The work is sufficiently stiff so that this angle relation still provides enough thrust upon the work so that it will feed through the chopper. Further, I pivot the cutting knife at such a point that the knife enters from one edge of the work across the same to the other edge with a shearing action so that but a small area of the waste strip is being cut at a single time, thus requiring a minimum of power for operation.

Referring to the drawing for a more detailed description of the invention, 10 designates generally a metal chopping device having a stationary blade 11 and a movable blade 12. These two blades are supported on a base 13 and the strip scrap material is fed through a guide 14 to between the blades and there severed or chopped into small pieces. The guide 14 is of channel formation for a substantial extent of its length providing a wall 15 and end walls 16. The lower portion of the guide is closed by a wall 17 providing a recess 18 through which the strip scrap material is fed to the blades. The lower portion of the wall 17 terminates into a foot 19. The foot 19 is positioned to rest upon the stationary blade 11. Bolts 20 extend through the foot 19, blade 11, and are threadedly received in the upper edge of the base which firmly secures the guide and blade in position. The guide extends upwardly on a slant with the upper portion of the walls 15, 16 slightly curved so as to aid in guiding the strip material through the guide 14.

The movable blade 12 is secured to an arm 21 by bolts 22. The arm 21 is pivotally mounted to an ear 23 which extends from the base. A pivot stud 24 extends through the ear and arm and is secured in place by a nut 25. The relation of the arm 21 to the stationary blade is such that the movement of the arm will move the blade 12 past the stationary blade 11 in the manner to provide a progressive shearing action on the material from edge-to-edge thereof. The other end portion 26 of the arm is connected to a crank 27 by means of a link 28. The link 28 is movably connected to the crank 27 by a pivot pin 29 and to the arm 21 by a pivot pin 30. Rotation of the crank 27 will swing the arm about the pivot stud 24.

The crank 27 is power actuated by means of an electric motor 31 which in turn operates through a speed-reducing device 32. The motor has a base 33 which is secured to the base 13 by means of bolts 34. The speed-reducing device is provided with foot portions 35 which are secured to the base 13 at a position to align the driven shaft 36 thereof with the motor shaft 37. These two shafts are secured to each other by a coupling 38. The mechanism of the speed-reducing device may be of any approved manufacture and may consist of a worm 39 secured to the shaft 36 and a worm wheel 40 in mesh therewith and from which there extends a shaft 41. The crank 27 is secured to the shaft 41 in any approved manner, such as by a set screw 42.

The device or apparatus thus far described may be employed with any machine in which the waste stock emerges from the machine in strip form. In the instant application, the apparatus is shown attached to the side of a power press 43. The power press is of a usual design having uprights 44 between which is slidably mounted a ram 45 which is secured to a crank shaft 46 having a pulley 47 attached thereto and rotatable to reciprocate the ram 45. The press has a table top or base 47' supported on legs 48. The die 49 is supported on the base 47' and the strip material is advanced to the die by means of feed rollers 50, 51, which are rotated in proper time relation with the reciprocation of the ram 45 by mechanism not shown.

The apparatus 10 is attached at one side of the press in position to place the guide 14 below the path of travel of the stock and at right angle to and in line with the feed rollers 50, 51. This is accomplished by means of a bracket 52 which may be fastened to the legs 48 or to any other convenient portion of the frame of the press. The base 13 is provided with lugs or ears 53 having openings 54 through which bolts 55 extend, and these are threadedly received in the bracket 52. These bolts secure the apparatus to the press in spaced relation therewith with the guide 14 sufficiently spaced from the feed rollers 50, 51 so as to permit forming of a bow 56 in the scrap material prior to its entering the guide 14. By this arrangement, the time relation between the press operation and the scrap-severing apparatus 10 need not be critical. Such changes in the length of the stock between the feed rolls and the cutting blades 11, 12 because of variation which may occur between the timing of the press and that of the cutting blades will be compensated for in the bow of the stock. The stock usually worked upon by the press is of sufficient stiffness to permit a substantial bow to be placed in the stock and still provide enough thrust so that it will properly feed through the apparatus 10.

It will be apparent that I have provided an apparatus which operates in a manner to sever or chop in small pieces strip scrap material as it leaves the feed rollers of the press and that provisions have been made for compensating for any such variation in the timing between the action of the press and that of the cutting blades, whereby the operation of the shearing blades will not affect the operation of the press.

In some cases, the motor 10 may be supported independently of the press by being provided with legs of its own.

I claim:

1. In combination with a pair of feed rolls for advancing strip stock through a metal working machine, a pair of cutting blades mounted for relative swinging movement to and from each other in a path extending substantially parallel to the path of movement of said strip stock through said machine, and a guide extending at a right angle to said blades for guiding the waste strip material as delivered from said feed rolls to between said blades to be sheared thereby, said guide being positioned from said feed rolls a distance sufficient to permit a substantial bow to be placed in the waste strip stock extending between said guide and said feed rolls.

2. In combination with a pair of feed rolls for advancing strip stock through a metal working machine, an arm pivotally mounted for swinging movement in a path extending substantially parallel to the path of movement of said strip stock through said machine, a stationary blade, a blade mounted on said arm for movement therewith and movable to and from said stationary blade, and a guide extending at a right angle to said blades for guiding the waste strip material as delivered from said feed rolls to between said blades to be sheared thereby, said guide being positioned from said feed rolls a distance sufficient to permit a substantial bow to be placed in the waste strip stock extending between said guide and said feed rolls.

GEORGE O. LETOILE.

REFERENCES CITED

The following references are of record in the file of this patent:

UNITED STATES PATENTS

| Number | Name | Date |
|---|---|---|
| 1,609,579 | Shields | Dec. 7, 1926 |
| 2,004,021 | Tucker | June 4, 1935 |